March 13, 1962 F. J. DROEGE ET AL 3,024,980

ALPHA-NUMERIC HOLE CHECKING SYSTEM

Filed Dec. 10, 1958 7 Sheets-Sheet 1

FIG. I

INVENTORS.
FREDERICK J. DROEGE
HERMAN J. KLOTZ
MITCHELL P. MARCUS
BY
Francis V. B. Giolma
ATTORNEY March 13, 1962 F. J. DROEGE ET AL 3,024,980

ALPHA-NUMERIC HOLE CHECKING SYSTEM

Filed Dec. 10, 1958 7 Sheets-Sheet 2

ALPHA-NUMERIC HOLE CHECKING SYSTEM

Filed Dec. 10, 1958

| CHARACTER | CARD CODE | | | | | | | | | | | | STORAGE CODE | | | | | |
|---|---|---|---|---|---|---|---|---|---|---|---|---|---|---|---|---|---|---|
| | 9 | 8 | 7 | 6 | 5 | 4 | 3 | 2 | 1 | 0 | X | R | X | 0 | 8 | 4 | 2 | 1 |
| BLANK | | | | | | | | | | | | | | | | | | |
| • | | X | | | | | X | | | | | X | X | X | X | | X | X |
| ◇ | | X | | | | X | | | | | | X | X | X | X | | X | |
| & | | | | | | | | | | | | X | X | X | | | | |
| ¢ | | X | | | | | X | | | | X | | X | | X | | X | X |
| * | | X | | | | X | | | | | X | | X | | X | | X | |
| — | | | | | | | | | | | X | | X | | | | | |
| / | | | | | | | | | X | X | | | | X | X | X | | X |
| 9 | | X | | | | | X | | | X | | | | X | X | | X | X |
| % | | X | | | | X | | | | X | | | | X | X | | X | |
| # | | X | | | | | X | | | | | | | | X | | X | X |
| @ | | X | | | | X | | | | | | | | | X | | X | |
| A | | | | | | | | | X | | | X | X | X | X | X | | X |
| B | | | | | | | | X | | | | X | X | X | X | X | | |
| C | | | | | | | X | | | | | X | X | X | X | | | X |
| D | | | | | | X | | | | | | X | X | X | X | | | |
| E | | | | | X | | | | | | | X | X | X | | X | X | X |
| F | | | | X | | | | | | | | X | X | X | | X | X | |
| G | | | X | | | | | | | | | X | X | X | | | X | X |
| H | | X | | | | | | | | | | X | X | X | | | X | |
| I | X | | | | | | | | | | | X | X | X | | | | X |
| J | | | | | | | | | X | | X | | X | | X | X | | X |
| K | | | | | | | | X | | | X | | X | | X | X | | |
| L | | | | | | | X | | | | X | | X | | X | | | X |
| M | | | | | | X | | | | | X | | X | | X | | | |
| N | | | | | X | | | | | | X | | X | | | X | X | X |
| O | | | | X | | | | | | | X | | X | | | X | X | |
| P | | | X | | | | | | | | X | | X | | | | X | X |
| Q | | X | | | | | | | | | X | | X | | | | X | |
| R | X | | | | | | | | | | X | | X | | | | | X |
| S | | | | | | | | X | | X | | | | X | X | X | | |
| T | | | | | | | X | | | X | | | | X | X | | | X |
| U | | | | | | X | | | | X | | | | X | X | | | |
| V | | | | | X | | | | | X | | | | X | | X | X | X |
| W | | | | X | | | | | | X | | | | X | | X | X | |
| X | | | X | | | | | | | X | | | | X | | | X | X |
| Y | | X | | | | | | | | X | | | | X | | | X | |
| Z | X | | | | | | | | | X | | | | X | | | | X |
| 0 | | | | | | | | | | X | | | | X | | | | |
| 1 | | | | | | | | | X | | | | | | X | X | | X |
| 2 | | | | | | | | X | | | | | | | X | X | | |
| 3 | | | | | | | X | | | | | | | | X | | | X |
| 4 | | | | | | X | | | | | | | | | X | | | |
| 5 | | | | | X | | | | | | | | | | | X | X | X |
| 6 | | | | X | | | | | | | | | | | | X | X | |
| 7 | | | X | | | | | | | | | | | | | | X | X |
| 8 | | X | | | | | | | | | | | | | | | X | |
| 9 | X | | | | | | | | | | | | | | | | | X |

FIG. 8

March 13, 1962 F. J. DROEGE ETAL 3,024,980

ALPHA-NUMERIC HOLE CHECKING SYSTEM

Filed Dec. 10, 1958 7 Sheets-Sheet 7

United States Patent Office 3,024,980

Patented Mar. 13, 1962

3,024,980

ALPHA-NUMERIC HOLE CHECKING SYSTEM

Frederick J. Droege, Vestal, Herman J. Klotz, Endicott, and Mitchell P. Marcus, Johnson City, N.Y., assignors to International Business Machines Corporation, New York, N.Y., a corporation of New York Filed Dec. 10, 1958, Ser. No. 779,354

8 Claims. (Cl. 235—61.7)

This invention relates generally to record controlled machines, and it has reference in particular to error checking means for checking the number of holes read in a record card or the like.

A basic diffculty of card controlled machines is the problem of being certain that all of the holes in the card field under consideration are being read from each card. In a numeric machine, where each column read must have one and only one hole, the problem is relatively simple. However, in a machine of the alphabetic variety, it is difficult to provide an adequate check of the number of holes read to determine that the machine did not drop or gain a hole from each card, since different columns may contain widely differing numbers of holes. One approach to this problem is to count the holes read in each column at two separate brush stations. If these two counts differ, there has been a loss or gain of information at one or both brush stations, and an error has occurred. If the two counts agree, either there has been no error, or similar errors have occurred at both stations. While no foolproof system exists for checking the holes in an alphabetic system, it will be seen that an indirect count of the holes, by retranslating the storage code and interpreting it to arrive at a hole count, provides just about as conclusive a check as is possible, inasmuch as it can give a check from the brushes right up to the compare units of the machine.

In practicing the present invention in accordance with one of its embodiments, the number of holes sensed or read in a card at the first and second of two different brush stations is checked by utilizing logic circuitry to convert the output of a magnetic core data storage matrix in which the sensed data is stored at each station into an equivalent hole count, storing the equivalent hole count from the first brush station in an auxiliary core storage unit until the same card is sensed at the second station, and then reading out the stored hole count and comparing it with the hole count from the second station. To make room for storing the hole count from a subsequent card, the stored hole-count data from the previous card must be utilized first. Both cards are having their hole-count data presented simultaneously, one column at a time. When a given column time arrives, the hole-count data from the auxiliary core storage unit must first be compared against the hole-count data from the second brush station. Then, during the remaining portion of that column time, the hole-count data from the first brush station can be stored in that (now empty) column of the auxiliary core storage unit.

Accordingly, it is an object of the present invention, generally stated, to provide a new and improved hole checking system for record card controlled machines.

More specifically, it is an object of this invention to provide in a record card controlled machine for checking the holes read in a card indirectly, so as to include in the checking operation as much of the machine circuitry as is possible.

Another object of this invention is to provide in a record card controlled machine for using logic circuitry for converting stored data read from cards at one sensing station into an actual hole count, for the purpose of comparing it with a similarly converted count from stored data read from the same card at another station.

It is an important object of this invention to provide for using logic circuitry to convert stored card code data read from a card at one station into a hole count, storing this hole count, and subsequently comparing it with a converted stored code data read from the same card at another station a card cycle later.

Another important object of this invention is to provide a hole checking system for a record card controlled machine for sensing the holes in a record card at one station and storing a data designation thereof during one card cycle, subsequently sensing the holes in the same card at another station and storing a data designation thereof during a following card cycle, converting the data designations stored into hole counts, storing the hole count from the first station and reading out the stored hole counts in the early portion of a time interval between card readings to compare them with the hole-count readings of the same card from the other station, then storing a new hole-count reading in the latter portion of the interval before sensing another card at the first station.

Yet another object of the invention is to provide for reducing the amount of storage required per column in a record card controlled machine by storing only an indication of the number of holes in a column.

It is also an object of this invention to provide in a record card controlled machine for checking the holes read in a card at two different sensing stations by converting the data designations on the card to a different code arrangement at each of the stations, and interpreting the converted code arrangement to determine the particular hole-count combination producing them, and then comparing the resultant hole-count combinations to determine their equality.

Other objects of the invention will be pointed out in the following description and claims and illustrated in the accompanying drawings, which disclose, by way of examples, the principle of the invention and the best mode, which has been contemplated, of applying that principle.

In the drawings:

FIG. 8 is a chart showing the relationship of the card and storage codes to the character representation.

In each of the drawings of the various control devices, the individual components or units making up that device are indicated in general merely as a box or block. The specific circuitry of such blocks will not be generally described as applied to various typical forms of tubes and diode circuits. A detailed description of typical diode coincidence switches, diode mixers, inverters, latches along with cathode followers and power tubes where required, and which would be applicable or necessary to apparatus of this type, is generally omitted in the present application, and is shown and described in detail in the application of F. E. Hamilton et al., Serial No. 544,520, now Patent No. 2,959, 351, filed November 5, 1955, and assigned to the assignee of the present invention.

For the purpose of this description, a typical coincident switch, shown as a triangle and otherwise known as a logical AND circuit or diode switch, comprises diodes or the like not shown, each including an individual input terminal normally biased negative so that the common terminal is at the negative potential with respect to ground. If coincident positive pulses are applied to all input terminals, the potential of the output terminal is raised. However, if any one of the input terminals is pulsed positively, the potential of the common output terminal is not raised appreciably. Any voltage responsive device may be controlled by the potential of the output terminal to furnish a usable output voltage level whenever a coincidence of positive input pulses is detected.

A typical mixer, otherwise known as a logical OR circuit or diode mixer, may also comprise diodes or the like. In the present drawings to distinguish diode mixers from diode switches, the former is shown as an arc of a circle. Any suitable voltage responsive device may be controlled by the potential of the common output terminal of the diode mixer. This terminal is connected by a suitable resistor to a negative voltage source, not shown, and maintains a negative bias in the related tube circuit. Each diode is connected to an individual input terminal, which in turn is connected in the electrical circuit. If either one or all of the diode input terminals is pulsed positively, the potential of the output terminal is raised, which permits the tube or other device associated therewith to conduct or operate in a predetermined manner.

While cathode followers, inverters, pulse shapers, timing rings and the like are not shown in detail, it is to be understood that any of the numerous well-known types may be utilized in the different locations, and the circuits may involve various resistance values and capacity couplings to produce the desired outputs. Since the details of the particular cathode followers, inverters, pulse shapers, etc., used are not a part of the invention, a detailed description of each possible type is not deemed necessary, since the details thereof are well within the skill of one versed in the art.

Figure 1:
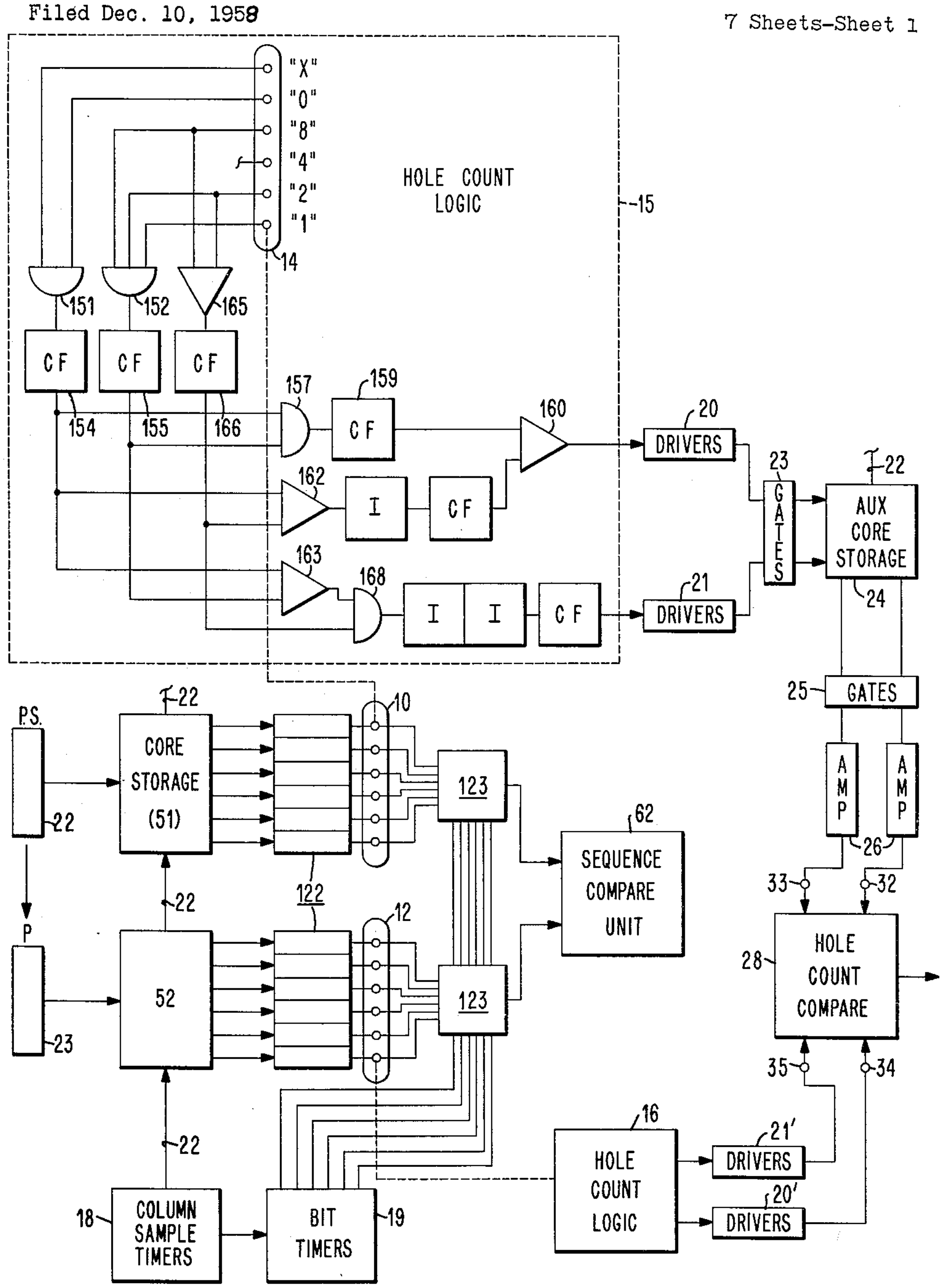
FIG. 1 is a schematic block diagram of a portion of a collator showing the application of the invention in one of its forms.

Referring particularly to FIG. 1 of the drawings, it will be seen that in a record card controlled machine, primary sequence and primary brush stations 22 and 23 are utilized in connection with a primary sequence core storage unit 51 and a primary core storage unit 52 for storing data representations direct from cards passing through the primary sequence and primary brush stations in sequence, for storing coded data representations of data punched in the cards. Converters or pulse shapers and amplifiers 122 are utilized to shape the outputs from the core storage units, which outputs are gated by means of diode switching means 123 for the purpose of applying them to a primary sequence compare unit 62 in the manner described in detail in the copending application Serial No. 631,855 of H. J. Klotz, now Patent No. 2,995,-241, which was filed on December 31, 1956, and is assigned to the assignee of the present invention.

In order to provide for checking the number of holes read in a particular card passing through the brush stations 22 and 23, terminal means 10 and 12 are utilized to provide connections to corresponding terminal means, such as the terminal means 14, in hole-count logic circuits 15 and 16, which are associated with the core storage units 51 and 52, respectively. A column sample driver or timing circuit 18, which provides a timed pulse for each column, and a bit timer 19, which provides a sequence of timed bit pulses for each column pulse, are utilized in conjunction with the core storage circuits 51 and 52 and the switching means 123, for reading information out of the core storage circuit into the sequence compare unit 62 and the logic circuits 15 and 16. At the same time, information is read out of the core storage units 51 and 52 to the sequence compare unit 62, the outputs are applied from the terminal means 10 and 12 to the corresponding terminal means of the hole-count logic circuits 15 and 16 for selectively operating hole-count drivers 20, 20' and 21, 21'. The hole-count drivers 20 and 21 associated with the hole-count logic 15 are connected by means of gates 23 to an auxiliary core storage unit 24, which is connected by means of conductors 22 so as to be read out by the sample core drivers 18 through gates 25 and amplifiers 26, to be compared in a hole-count compare circuit 28 with a corresponding hole count from the drivers 20' and 21' associated with the hole-count logic 16.

Figure 2:
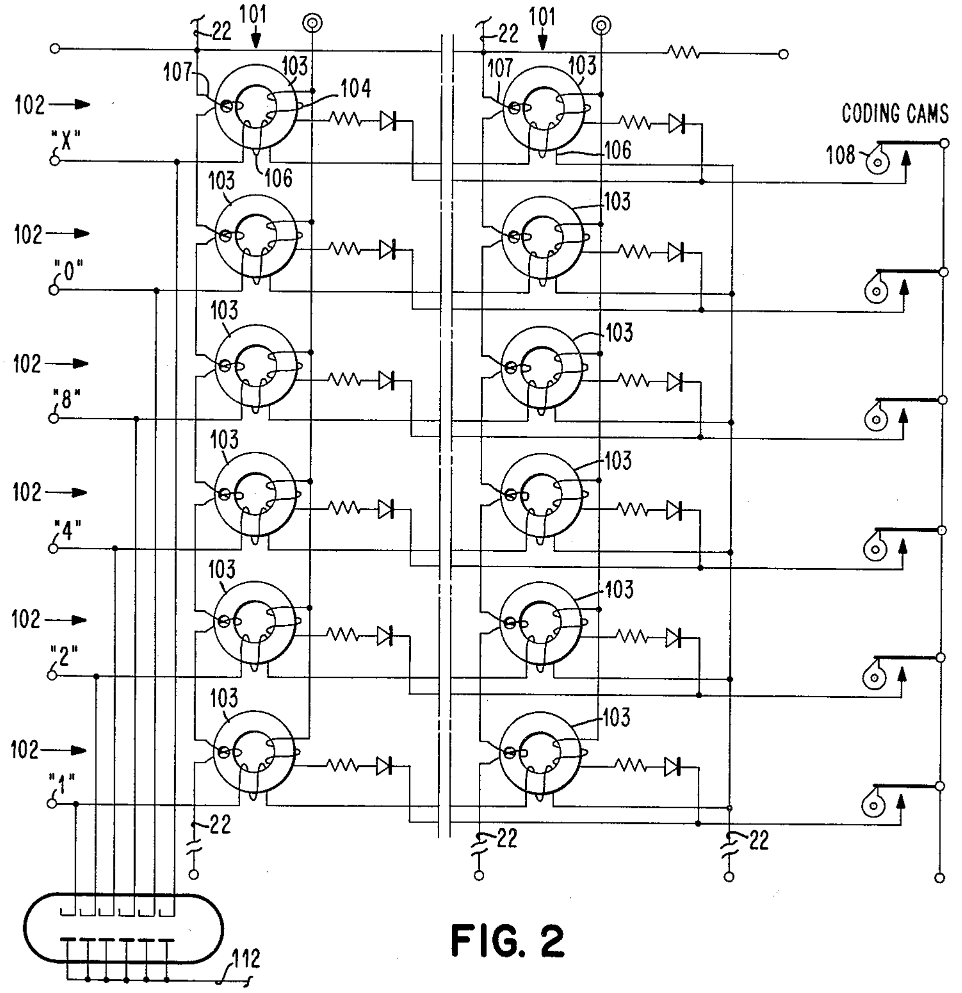
FIG. 2 is a schematic diagram of the core storage unit shown in FIG. 1.

Each of the storage devices 51 and 52 comprises, as shown in FIG. 2, a saturable magnetic core matrix defined by a plurality of cores 103, which are arranged along columns 101 and rows 102 in a general manner well known in the art. The core devices per se are of the so-called nondestructible readout (NDRO) variety, each of the core devices including a write winding 104 connected to its respective brush, a read-reset winding 106 and a sample winding 107. Each of the core columns 101 is associated with a respective one of a selective field of record card columns, and each of the core rows 102 is representative of one of a 1–2–4–8–0–X binary code notation. Since the particular Hollerith code generally used in punched cards is not in itself collatable, the card code is converted in the core storage to a storage code, as represented in FIG. 8, by means of coding cams, such as the cams 108, which are arranged to close in different predetermined timed orders. Reset of the cores is effective by applying pulses to the sense windings through a conductor 112 after readout.

The information to be stored in the core storage matrix device is caused to be decoded from the Hollerith code and entered from the record card in a parallel-by-column fashion. The stored information in accordance with the data applied to the write windings 104, is read out of the storage devices in a parallel-by-bit serial-by-column fashion by operation of the column sample timing ring 18 by means of timed pulses over conductors 22. The bit timer 19 converts this output to serial-by-bit serial-by-column. In response to each sample test pulse applied from the timer 18 over conductors 22 to the sample windings 107, the binary notation bits of information represented within a core column 101 are transmitted in parallel from the said storage device to the primary-primary sequence data compare apparatus 62.

Figure 3:
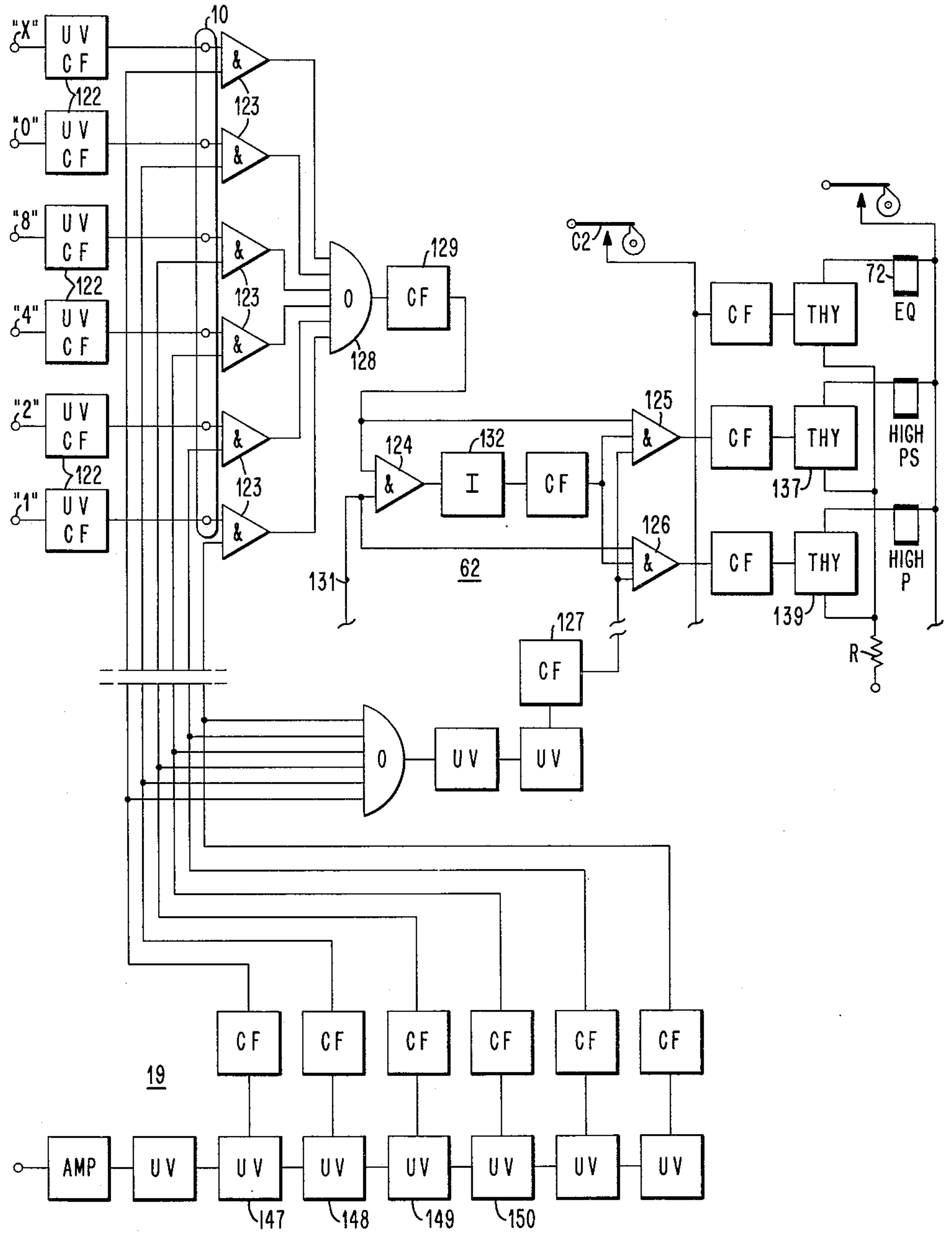
FIG. 3 is a schematic diagram of a portion of the collator circuit shown in FIG. 1 illustrating in more detail the logic circuitry therein employed.

As shown in FIG. 3, these binary notation bits are applied to their individual shapers 122, each comprising a multivibrator and cathode follower unit designated by UV–CF, and are switched by means of logic AND diode switches 123 in conjunction with timed signals from the bit timer 19 which comprises a plurality of multivibrators UV devices 147—150, etc., which are connected through cathode followers CF to the diode switches 123. The outputs from these diode switches are mixed in a diode mixer 128 and applied through a cathode follower 129 to the compare unit 62 in conjunction with a corresponding output signal from a diode mixer from the primary core storage unit over a conductor 131. Since the primary bit notations are read out of the core storage units in timed relationship, the occurrence of a high order bit will precede a low order bit. Accordingly, if the primary sequence core storage unit 51 has a high order bit, an output from the cathode follower 129 will be made to the diode switch 124 and to the diode switch 125. Since no output occurs over the conductor 131 at this time, the diode switch 124 is not switched on. Hence, the inverter 132 provides an output which is switched with the output from the cathode follower 129 and a timed signal from bit driver 19 through cathode follower 127 to provide an output for rendering a thyratron 137 conductive to indicate a high primary sequence. In the event that the primary and primary sequence data are equal, the diode switch 124 is switched on and the output of the inverter 132 is therefore down, and neither diode switch 125 or 126 will be conductive. Accordingly, neither of thyratrons 137 or 139 will be rendered conductive, and an equal relay 72 will be picked at equal time by the later operation of the equal cam C2. Operation of the other one of the high primary sequence and high primary relays, or equal relay 72, is prevented should either of the high primary sequence or high primary relays 71 and 73 be operated first, because of the voltage drop produced in the cathode resistor R.

Referring again to FIG. 1, it will be seen that the hole-count logic circuit of 15 utilizes diode mixers 151 and 152, which are connected respectively to the X and 0 bit terminals and the 8, 2 and 1 terminals of terminal means 14. The outputs of these diode mixers are applied through cathode followers 154 and 155 to a diode mixer 157, the output of which is applied to a diode switch 160 through a cathode follower 159 for operating the hole-count driver 20 to register either a single hole or a pair of holes in the card. The output of the cathode follower 154 is also applied to a diode switch 162 and a diode switch 163. A diode mixer 165 is connected to the 2 and 8 bit terminals and then to a cathode follower 166, to gate with the output from cathode follower 154 at diode switch 162 and to mix at a diode mixer 168 with the output from the diode switch 163. Inverters I and cathode follower CF are utilized to shape the output of the diode mixer 168 for operating the hole-count driver 21 to record either two or three holes in the card.

Figure 4:
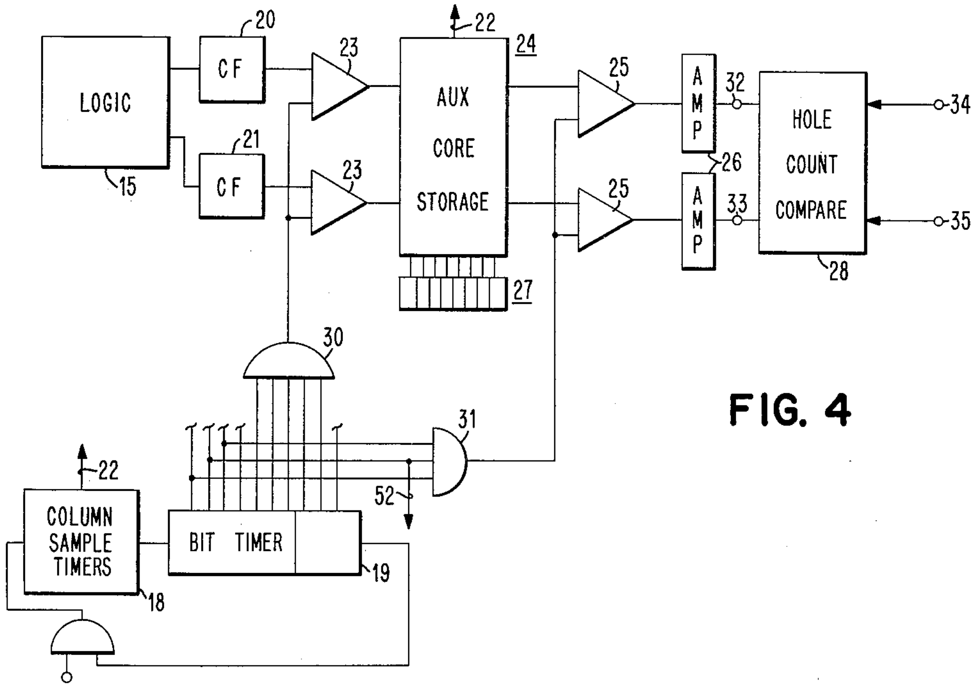
FIG. 4 is a schematic diagram of a portion of the logic circuitry employed in the circuit of FIG. 1.

Referring to FIG. 4, it will be seen that the output from the logic hole-count circuit 15 is applied through the cathode follower drivers 20 and 21 to the auxiliary core storage unit 24 by means of diode switches or gates 23, which are controlled from the bit timer 19 through a diode mixer 30, so that readin to the auxiliary core storage 24 is effected column by column under the control of a column latch ring 27, during the latter portion of the column time as determined by the timing cycle, while readout from the auxiliary core storage unit of data already stored therein is effected through diode switches 25 and the amplifiers 26 to the hole-count compare circuit 28 in response to pulses from the bit timer 19 through an OR or diode mixer circuit 31 during an earlier portion of the bit timing cycle, thereby permitting the maximum utilization of the core storage device 24. Outputs from the core storage unit 24 are applied at terminals 32 and 33, while the corresponding outputs from units 20' and 21' are applied at terminals 34 and 35.

Figure 5:
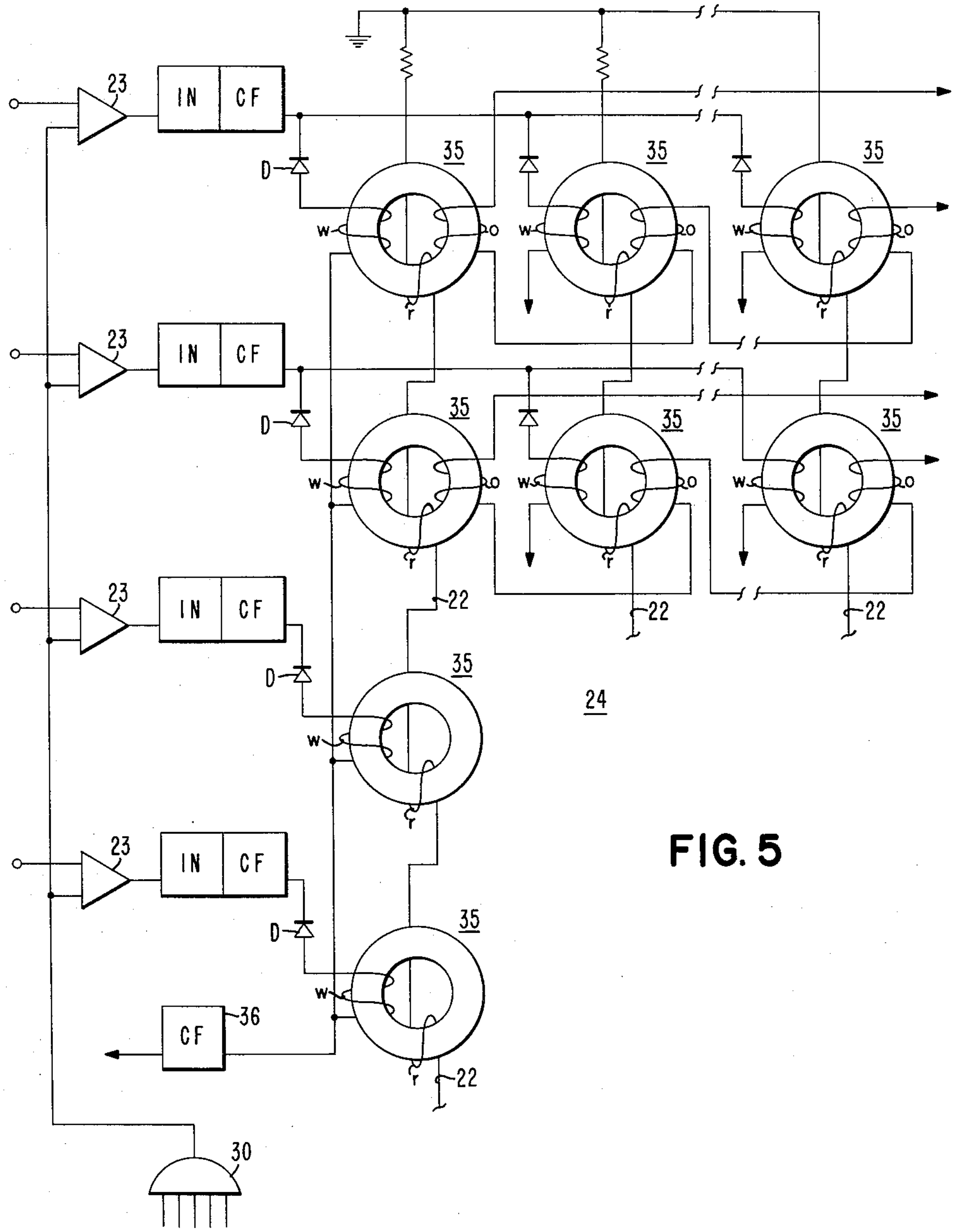
FIG. 5 is a schematic diagram of the auxiliary core storage unit of FIG. 1.

As shown in FIG. 5, the auxiliary core storage device 24 may comprise a plurality of magnetic core storage elements arranged two in each column of data to be compared, the upper one being, for example, associated with the hole-count means 20 and the lower one being connected with the hole-count means 21. The storage devices are provided with write windings *w* which are connected to their respective hole-count devices through diodes D, and through individual cathode followers 36, which are part of the column latch ring circuit 27. Output windings *o* are provided, which are disposed to be connected in series for each of the hole-count groups and connected to the diode gates 25 for applying hole-count signals to the compare circuit 28. Read-reset windings *r* are also provided on the magnetic core devices, and these windings for each column are connected in series and to the column timing circuit 18 of FIG. 1 via conductors 22 for reading out the core devices and resetting them, column by column.

Figure 6:
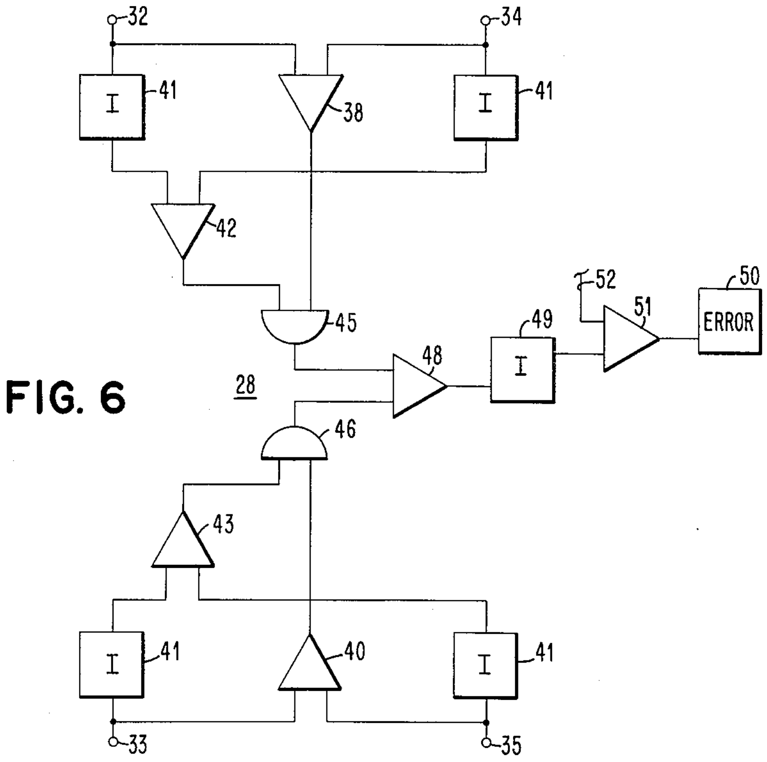
FIG. 6 is a schematic block diagram of the logic compare circuitry utilized in the hole-count circuit of FIG. 1.

Referring to FIG. 6, it will be seen that the hole-count compare circuit 28 of FIG. 1 may comprise a logic circuit with inputs at terminals 32 and 34 from the amplifier 26 associated with hole-count device 20 and the hole-count device 20' to a diode switch 38, and at terminals 33 and 35 from the amplifier 26 associated with hole-count device 21 and the hole-count device 21' of the hole-count logic 16 to a diode switch 40. Inverters 41 are provided in conjunction with the diode switches 38 and 40 for selectively operating diode switches 42 and 43. The outputs of these diode switches are mixed at diode mixers 45 and 46 for operating a diode switch 48, the output of which is applied to inverter 49 for operating an error indicator 50 through a diode switch 51 which gates with a timed pulse over conductor 52 from the bit timer 19 at error sample time in the event that the hole-count indication evidenced by the hole-count devices in the primary sequence and primary stations are not the same.

Figure 9:
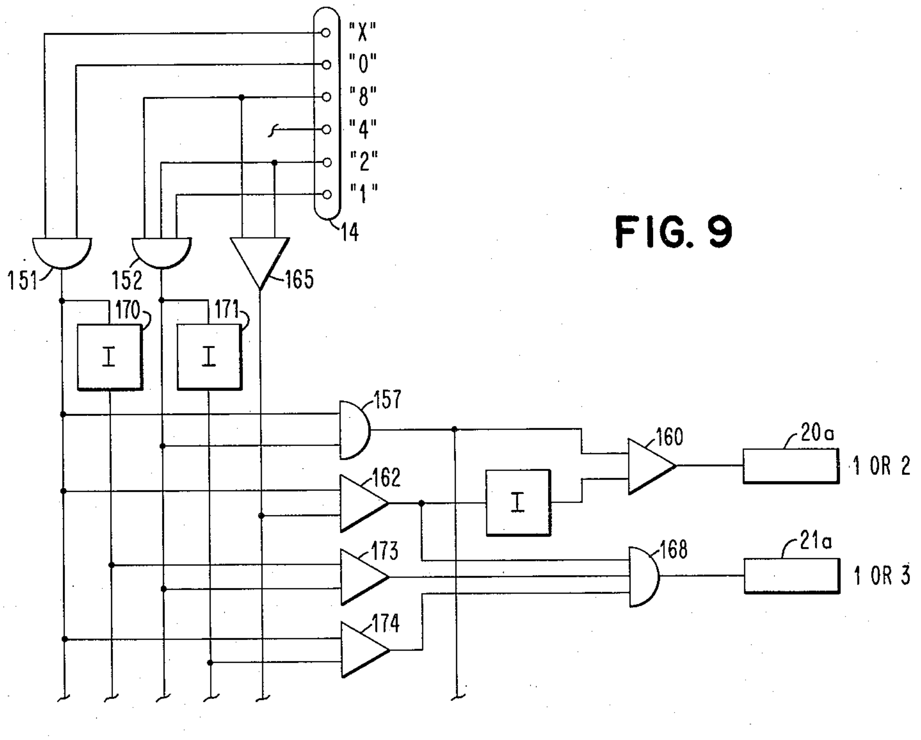
FIG. 9 is a schematic diagram showing the logic circuitry for a modified form of hole-count logic.

Referring to FIG. 9, it will be seen that the logic circuitry therein shown is utilized to effect operation of hole-count device **20*a* in the event that a count of one or two holes is indicated, while operation of the other hole-count device 21*a* is effected in the event that a hole count of one or three holes is indicated. In this application, diode mixers 151 and 152 are utilized in conjunction with a diode switch 165 in the same manner as shown in FIG. 1, and the diode mixer 157 is likewise operated in response to an output from either of the diode mixers 151 and 152. The diode switch 162 is likewise similarly connected to an inverter for effecting operation of the diode switch 160. Inverters 170 and 171 are utilized in conjunction with the diode mixers 151 and 152 for providing inverted signals to be applied to diode switches 173 and 174 in conjunction with signals from the diode mixers 152 and 151 for effecting operation of the hole-count device 21*a* through a diode mix 168. With this logic circuitry, the hole-count device 20*a* is operated in response to a storage code arrangement involving either a zone or a numeric and not an 82 combination with a zone indication. The hole-count device 21*a*** is rendered effective in response to an indication of a numeric and no zone, or a zone and no numeric or an 82 combination with a zone indication.

Figure 10:
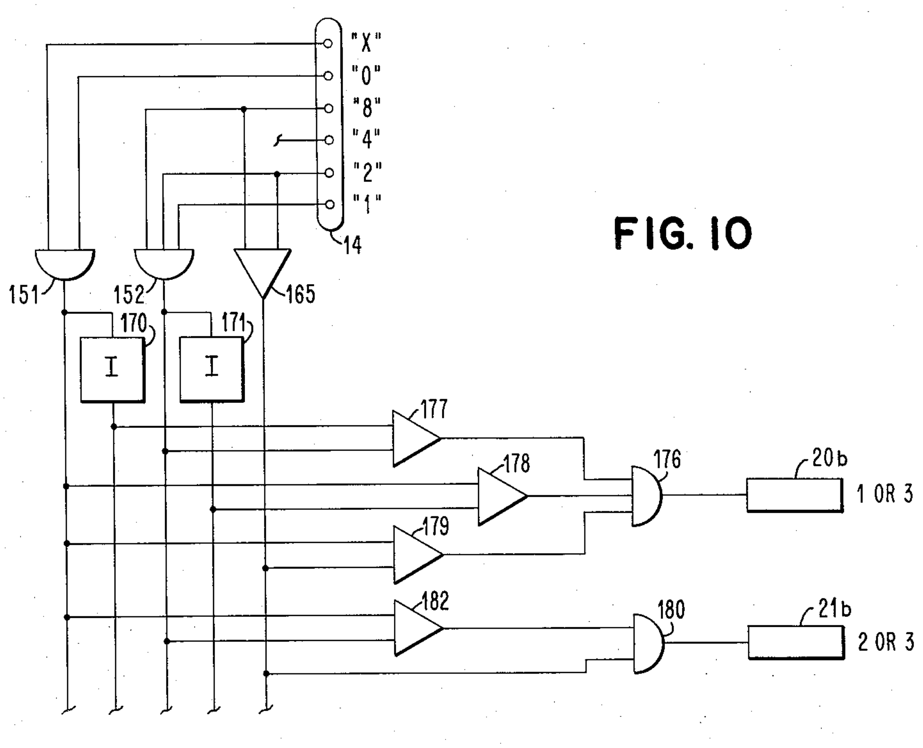
FIG. 10 is a schematic diagram of the logic circuitry for still another form of the hole-count logic which may be used with the system of FIG. 1.

Referring to FIG. 10, it will be seen that the circuitry, while generally similar to that of FIGS. 1 and 9, differs slightly therefrom. Diode mixers 151 and 152 are used in conjunction with a diode gate 165 along with inverters 170 and 171. The hole-count device **20*b*, however, is operated through a diode mixer 176 from diode switches 177, 178 and 179, while as shown, hole-count device 21*b* is operated through a diode mixer 180 from the output of the diode switch 165 or from the output of a diode switch 182 in response to coincidence of outputs from the diode mixers 151 and 152. This arrangement of logic circuitry operates the hole-count device 20*b* for one or three holes, and the hole-count device 21*b*** for two or three holes.

In operation, a card passes by the primary sequence station 22 and the primary station 23 in that order. When the card is read at the primary sequence brush station 22, the data stored therein by means of coded hole arrangements is read by the brushes at the primary sequence station and the information stored in the core storage device 51. At readout time, this information is read out of core storage and transferred through the converter 122 and the diode switches 123 to the sequence compare unit for comparing the sequence of primary sequence and primary cards being read, in the usual manner. At such readout time, it is desirable to compare the number of holes read in a card at the primary station 23 with a previous reading of the number of holes read in the same card a cycle earlier at the brush station 22. This is accomplished by connecting the hole-count logic circuit 15 to the terminal means 10 and applying the output of the converter 122 to the logic circuitry 15 at readout time immediately following the passage of the card through the primary sequence station 22. If, for example, the alphabetic character A was represented in the card, thus requiring a 1 and a R hole in the card, this will be represented in the storage code by X, 0, 8, 4 and 1 bits. By elimination, it has been found that the 4 bit is not the determinant of any particular number of holes, since it occurred in each of the possible combinations. Accordingly, X, 0, 8 and 1 bit signals are applied to the diode mixers 151 and 152 to the diode switch 165. Outputs are therefore provided by the first two of these elements. An output is therefore provided by the cathode follower 159 and applied to the diode switch 160. However, one input is missing from the diode switch 162, so that the inverter input is down, and accordingly, a signal is provided by the cathode follower to the diode switch 160 to thus operate the hole-count device 20. At the same time, outputs from the cathode followers 154 and 155 are applied to the diode switch 163 to effect operation of the hole-count device 21 through diode mixer 168 and the following inverters and cathode followers. Accordingly, both hole-count devices are operated, indicating a 2 hole count. The output from these hole-count devices is applied by the gates 23 to the core storage circuit 24 in the latter part of the timing cycle as indicated by the arrangement shown in FIG. 4. This hole count is held in the core storage device 24 until the card from the primary sequence station 22 moves to the primary station 23 and its data recorded therein by means of holes is read into the core storage device 52. In the meantime, a subsequent card is read by the primary sequence station 22, and the information therein recorded is stored in the core storage device 51.

At the end of this card reading cycle, the stored data in the storage device 52 is read out one column at a time and applied to the hole-count logic circuit 16 to effect operation of the hole-count devices 20' and 21'. At the same time, the stored hole count in the auxiliary core storage device 24 is read out a column at a time and applied through the gates 25 which, as shown in FIG. 4, are rendered conductive during the early part of each column time during the electronic cycle and are applied to the hole-count compare circuit 28. The data read from a subsequent card and stored in core storage device 51 is read into the auxiliary core storage device 24, after being converted by the hole-count logic 15 and the hole-count devices 21 and 22, during the latter part of this same column time for use in the following card cycle.

In the event that a single hole is read at both stations, there will be no output from the hole-count devices 21 and 21', while outputs will occur from the hole-count devices 20 and 20'. Both of the inverters 41 associated with the hole-count devices 21 and 21' will therefore have outputs which are applied through the diode switch 43, to mixer 46, and thence to the lower terminal of the diode switch 48. At the same time, signals are applied through the diode switch 38 from the hole-count devices 20 and 20', causing an output therefrom to be applied through the diode mixer 45 to the upper terminal of the diode switch 48. The output of the inverter 49 will therefore be down and no error will be indicated. Should, however, there be an output from the hole-count device 21 and not an output from the hole-count device 21', indicating a difference in reading of the holes at the primary sequence and the primary brush stations, the output of the inverter 41 associated with the hole-count device 21 will be down, and accordingly, the diode switch 43 will not be switched. Since there was no output from the hole-count device 21', diode switch 40 is not switched, so that no output is applied to the lower terminal of the diode switch 48, and coincidence cannot occur. The output of the inverter 49 is therefore up, and the error device 50 is operated when the timing pulse gates with the inverter output at diode switch 51 to indicate an error condition.

With the arrangement shown, only two storage positions per column are required for each feed. For all combinations relating to a single hole in a column, only the first storage position is entered; for all combinations referring to three holes in a column, only the second storage position is entered. For all combinations directed to two holes in a column, both storage positions are entered. The first storage position is therefore entered for all combinations relating to one or two holes. These combinations are described by the expression $$[(0+X)+(8+2+1)][\overline{(0+X)82}]$$

Figure 7:
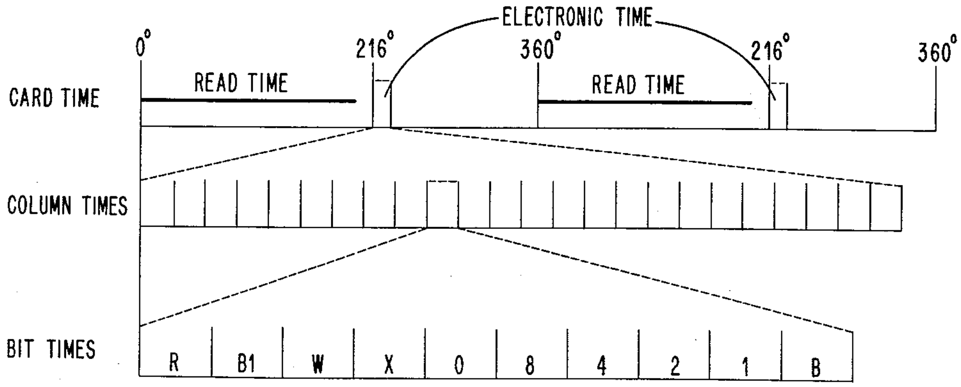
FIG. 7 is a chart illustrating the timing relationship between the bit and column timing and the card reading time.

The second storage postion is entered for all combinations relating to two or three holes. These combinations are described by the expression $(0+X)(8+2+1)+82$. When the same card passes the second reading station, these same combinations are again generated at the primary hole-count circuitry and are compared with the results in storage. While the circuit described in detail shows a utilization of combinations arranged as one or two holes and two or three holes, it will be realized that this arrangement may vary with respect to the hole count as indicated by the logic circuitry shown in FIGS. 9 and 10 of the drawings. Since the system operates serially, each hole-count core device must be read out during the early portion of its own column time. This leaves the remainder of the column time for storing new information from the first brush station to be used duirng the next card cycle. This permits a maximum utilization of the core storage device eliminating unnecessary duplications of different core storage. Since only about 3.6 milliseconds are available for the electronic time between card reading times, it will be appreciated that reading 24 columns serially, allows only about 150 microseconds per column. With approximately 10 bit times for each column, the bit times, as shown in FIG. 7, only about 15 microseconds are available for each bit time. Thus, it will be appreciated that timing is an important consideration in the operation of the system.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intenion, therefore, to be limited only as indicated by the scope of the following claims.

What is claimed is:

1. In a record card controlled machine, a first station having sensing means for sensing data designations on a card, a second station having sensing means for sensing the same data on the same card subsequently, means for advancing cards in seriatim past the sensing means, data storage means for each of the sensing means, compare means, means connecting the storage means and compare means for effecting a comparison of data in the storage means, logic means activated by the storage means to convert the stored data into a hole count for data read from a card at each station, additional storage means for storing a hole count from the first station, hole-count compare means, and means connected to the hole-count compare means for reading out a hole count of a card from the additional hole-count storage means at the same time that the hole count of the same card is produced by the logic means at the second station.

2. The combination with a record card controlled machine having a pair of sensing means with means for feeding cards thereby in seriatim, storage means for each sensing means operable to store data parallel by bit, means for reading stored data out serial by bit, and compare means for comparing said serial-by-bit data, of logic means for converting the serial-by-bit data to a corresponding hole count, storage means for storing the hole count of the logic means associated with the first of said pair of sensing means, additional compare means, and means connecting the hole-count storage means and the logic means of the other of the pair of sensing means to the additional compare means for comparing the hole counts thereof.

3. In a control system for a machine responsive to data on cards having a plurality of columns of differently located index point positions, a pair of sensing devices disposed for sensing in sequence a column in a card moved past said sensing devices, storage means for storing data read from the card by each of the sensing devices, means for reading stored data from the storage means, hole-count means for indicating different ones of a plurality of hole counts, auxiliary storage means associated with the hole-count means of a first one of the sensing devices having a plurality of storage positions, logic means connecting the data storage means and hole-count means of the sensing devices to convert the output of the storage means into one of a number of different alternate hole counts each including a common designation, and selectively enter the counts into predetermined ones of the storage positions, hole-count compare means, and means for connecting the compare means to the hole-count storage means of the first sensing device and the hole-count means of the other sensing device.

4. In a control system for a machine having a brush at each of first and second sensing stations for sensing data designations in the same column of the same card in sequence, storage means at each station connected to its associated brush to store in a different code arrangement data sensed by said brush, hole-count means associated with each storage means, logic means connecting the hole-count means to the storage means for effecting selective operation of the hole-count means to count the holes in said column in response to the stored data code arrangement in each storage means, auxiliary storage means controlled by the hole-count means of the first station for storing a hole count of a given card, compare means, and means connecting the auxiliary storage means and hole-count means of the second station to the compare means for comparing the stored hole count of a card with the hole count of the same card at the second station.

5. In a record card controlled machine, first and second card sensing stations each having sensing means for sequentially sensing the same data designations according to one code arrangement on the same card, data storage means operated by the sensing means at each station for storing data designations according to a different code arrangement, logic means operable to translate the different code arrangements to provide an effective hole count of the number of holes and compare means operated by the hole-count means for comparing the two hole counts.

6. In combination with data storage means for storing readings of a data designation on a card from each of two stations in successive card cycles, compare means, a pair of hole-count means for each station, logic means connecting each pair of hole-count means to one of the storage means for effecting selective operation thereof in accordance with the number of holes read at the associated station, and means including an auxiliary storage device operated by the one hole-count means for storing a hole count from one card cycle and applying a signal in accordance therewith to the compare means to compare with a signal from the other hole-count means during the next card cycle.

7. In a record card controlled machine having first and second brush stations with brushes for sequentially sensing columnar coded data hole designations according to one code in the same card in different card cycles, storage means connected to the brushes at said stations to store sensed data designations according to a different code, a pair of hole-count devices at each station for indicating different numbers of holes in a column of the card, means including logic circuits responsive to the different code of data designations connecting the storage means and the associated hole-count devices for selectively operating the hole-count devices in accordance with said different code designations of data holes in the card, and compare means for comparing the counts of the hole-count devices of the two stations.

8. The combination with a record card controlled machine having a first and a second brush station each with brush means for sequentially sensing the same coded data designations of holes punched in a card, storage means at each station connected to the brush means at said station for storing a data designation of the data punched in the card according to a different code, compare means, circuit means connected to the storage means for reading out the stored designation, a pair of hole-count devices at each station, logic means connecting the storage means and the hole-count means at each station for selectively operating the hole-count means in accordance with the number of holes read by the associated brush means, auxiliary storage means connected to the hole-count means of the first station for storing a hole-count designation, compare means, means including timed gate means for connecting the auxiliary storage means and the hole-count means of the second station to the compare means, and error means operated by the compare means when the stored count and the second station hole count fail to compare.

References Cited in the file of this patent

UNITED STATES PATENTS 2,602,544 Phelps et al. ----------- July 8, 1952